(12) United States Patent
Peterson

(10) Patent No.: US 10,539,749 B2
(45) Date of Patent: *Jan. 21, 2020

(54) METHOD AND SYSTEM FOR A MULTI-FIBER PUSH-ON/PULL-OFF CONNECTOR LOCKING CLIP

(71) Applicant: Luxtera, Inc., Carlsbad, CA (US)

(72) Inventor: Mark Peterson, San Diego, CA (US)

(73) Assignee: Luxtera, Inc., Carlsbad, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/355,368

(22) Filed: Mar. 15, 2019

(65) Prior Publication Data

US 2019/0212504 A1 Jul. 11, 2019

Related U.S. Application Data

(63) Continuation of application No. 16/004,817, filed on Jun. 11, 2018, now Pat. No. 10,234,642, which is a continuation of application No. 15/397,353, filed on Jan. 3, 2017, now Pat. No. 9,995,887.

(60) Provisional application No. 62/387,799, filed on Jan. 4, 2016.

(51) Int. Cl.
*G02B 6/38* (2006.01)
*G02B 6/42* (2006.01)

(52) U.S. Cl.
CPC ......... *G02B 6/3893* (2013.01); *G02B 6/3825* (2013.01); *G02B 6/3853* (2013.01); *G02B 6/3885* (2013.01); *G02B 6/4292* (2013.01)

(58) Field of Classification Search
None
See application file for complete search history.

(56) References Cited

U.S. PATENT DOCUMENTS

2015/0177467 A1\* 6/2015 Gniadek ............... G02B 6/3894
385/58

\* cited by examiner

*Primary Examiner* — Chad H Smith
(74) *Attorney, Agent, or Firm* — McAndrews, Held & Malloy

(57) ABSTRACT

Methods and systems for a optical fiber connector locking clip are disclosed and may include operatively coupling an optical fiber connector to an optical fiber adaptor by inserting the optical fiber connector into the optical fiber adaptor, where the optical fiber connector comprises an optical fiber connector pull-to-release housing. The optical fiber connector may be secured to the optical fiber adaptor by placing an optical fiber locking clip adjacent to the optical fiber connector pull-to-release housing, thereby preventing the optical fiber connector pull-to-release housing from being actuated. An optical cable may be coupled to the optical fiber connector. The adaptor may be coupled to an optical device, which may include an optical transceiver. The optical fiber locking clip may be plastic or metal. The optical fiber connector and the optical fiber connector pull-to-release housing may be plastic.

15 Claims, 4 Drawing Sheets

METHOD AND SYSTEM FOR A MULTI-FIBER PUSH-ON/PULL-OFF CONNECTOR LOCKING CLIP

CROSS-REFERENCE TO RELATED APPLICATIONS/INCORPORATION BY REFERENCE

This application is a continuation of application Ser. No. 16/004,817 filed on Jun. 11, 2018, which is a continuation of application Ser. No. 15/397,353 filed on Jan. 3, 2017, now U.S. Pat. No. 9,995,887, which claims priority to U.S. Provisional Application 62/387,799, filed on Jan. 4, 2016, each of which is hereby incorporated herein by reference in its entirety.

FIELD

Certain embodiments of the disclosure relate to fiber optics. More specifically, certain embodiments of the disclosure relate to a method and system for a multi-fiber push-on/pull-off connector locking clip.

BACKGROUND

As data networks scale to meet ever-increasing bandwidth requirements, the shortcomings of copper data channels are becoming apparent. Signal attenuation and crosstalk due to radiated electromagnetic energy are the main impediments encountered by designers of such systems. They can be mitigated to some extent with equalization, coding, and shielding, but these techniques require considerable power, complexity, and cable bulk penalties while offering only modest improvements in reach and very limited scalability. Free of such channel limitations, optical communication has been recognized as the successor to copper links.

Further limitations and disadvantages of conventional and traditional approaches will become apparent to one of skill in the art, through comparison of such systems with the present disclosure as set forth in the remainder of the present application with reference to the drawings.

BRIEF SUMMARY

A system and/or method for a multi-fiber push-on/pull-off connector locking clip, substantially as shown in and/or described in connection with at least one of the figures, as set forth more completely in the claims.

Various advantages, aspects and novel features of the present disclosure, as well as details of an illustrated embodiment thereof, will be more fully understood from the following description and drawings.

DETAILED DESCRIPTION

Certain aspects of the disclosure may be found in a method and system for a multi-fiber push-on/pull-off connector locking clip. Exemplary aspects of the disclosure may comprise operatively coupling a multi-fiber push-on/push-off (MPO) connector to an MPO adaptor by inserting the MPO connector into the MPO adaptor, where the MPO connector comprises an MPO connector pull-to-release housing. The MPO connector may be secured to the MPO adaptor by placing an MPO locking clip adjacent to the MPO connector pull-to-release housing, thereby preventing the MPO connector pull-to-release housing from being actuated. An optical cable may be coupled to the MPO connector. The adaptor may be coupled to an optical device, which may include an optical transceiver. The MPO locking clip may be plastic or metal. The MPO connector and the MPO connector pull-to-release housing may be plastic.

Figure 1:
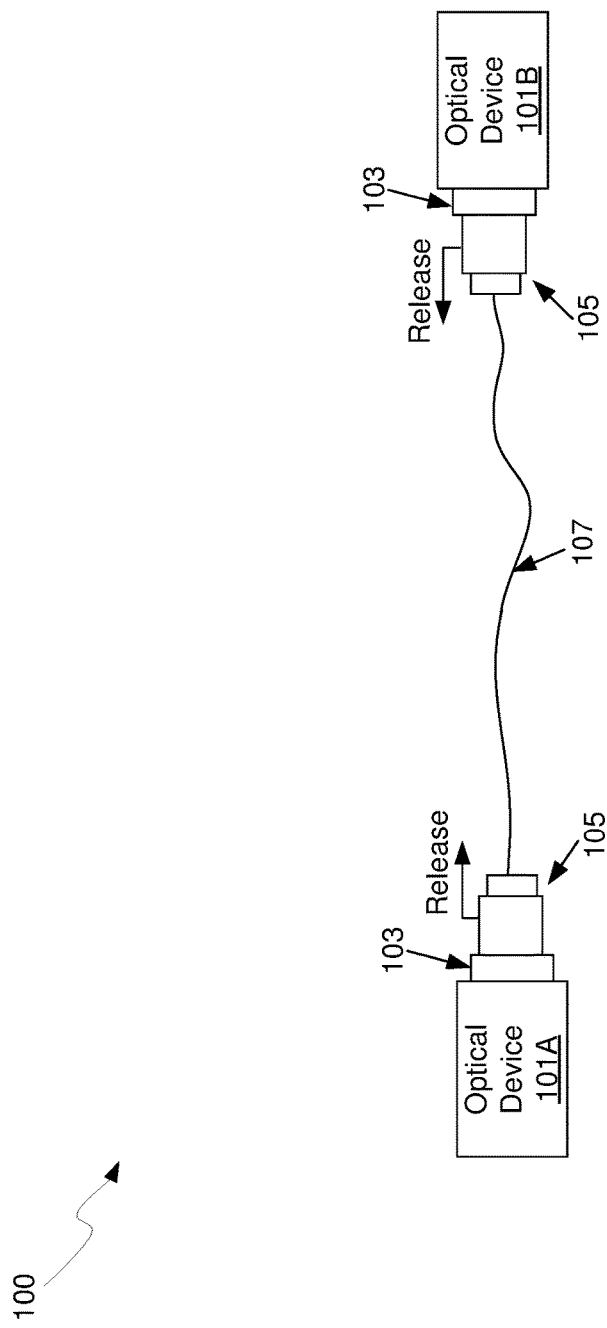
FIG. 1 is a diagram illustrating fiber optic communication utilizing multi-fiber push-on/pull-off connectors, in accordance with an example embodiment of the disclosure.

FIG. 1 is a diagram illustrating fiber optic communication utilizing multi-fiber push-on/pull-off connectors, in accordance with an example embodiment of the disclosure. Referring to FIG. 1, there is shown a fiber optic network 100 comprising optical devices 101A and 101B, multi-fiber push-on/push-off (MPO) adaptors 103, MPO connectors 105, and optical fiber 107.

The optical devices 101A and 101B comprise any device that is operable to communicate via optical signals for data communication or telecommunications applications. For example, the optical devices 101A and 101B may comprise optical transceivers integrated in servers for communicating data between racks of servers. Accordingly, the optical device 101A may generate optical signals from electrical signals, with the electrical signals either generated within the optical device 101A or received from another device or server.

The optical device 101A may then communicate the optical signals over the optical fiber 107 to the optical device 101B. The optical devices 101A and 101B comprise MPO adaptors 103 for receiving MPO connectors, also commonly referred to as MTP connectors.

The optical fiber 107 may comprise one or more single-mode or multi-mode cores in a single fiber for communicating a plurality of optical signals. For example, the optical fiber 107 may comprise an outer dimension of ~200 micron diameter and eight cores of ~9 micron diameter arranged in two rows of four cores. In other example scenarios, the optical fiber 107 may comprise either individual single-core single-mode fibers (for example 125 micron diameter with a single ~9 micron core) or multi-mode fibers (for example 125 micron diameter with a single ~50 micron core or a single ~62.5 um core) or ribbonized versions of the same single-core single-mode or multi-mode fibers arranged in a matrix of 4, 8, 12, or 24 fibers.

The MPO adaptors 103 provide a connection port in which MPO connectors may be inserted, and while the MPO adaptors 103 are shown on the optical devices 101A and 101B in FIG. 1, the disclosure is not so limited, as they may be utilized to couple two fibers instead, for example.

The MPO connectors 105 may comprise connectors at each end of the optical fiber 10 that may be inserted into the MPO adaptors 103, while supporting multiple core fibers. The MPO connectors 105 may comprise a lens to reduce alignment sensitivity and to reduce the impact of contamination on light coupling. In addition, the MPO 105 may comprise alignment features to ensure the signals received from the cores of the multi-core fiber align with a receiving fiber or device. In addition, the MPO connectors 105 comprise a locking feature, such as a locking ring, that ensures connection of the MPO connectors 105 to the MPO adaptors 103, which may be released by pulling the locking ring.

In operation, the MPO connectors 105 may be inserted into the MPO adaptors 103, with a locking ring fixing the connectors to the adaptors. A clocking clip may be inserted in the MPO connectors 103 to preclude an inadvertent disconnect of the MPO connectors 103 from the MPO adaptors 105. The optical devices 101A and 101B may then communicate optical signals via the optical fiber 107, with signals being communicated in a plurality of optical cores in the optical fiber 107.

The MPO connectors 105 may enable the alignment of the cores at each end so that optical signals may be communicated from a core in one optical fiber to a corresponding core in another optical fiber. The multi-core connectors 105A and 105B may comprise lenses and alignment features to ensure the alignment of the optical signals with the appropriate receiving fiber cores. To remove the fiber 107 from the optical devices 101A and 101B, the locking clips may be removed from the MPO connectors 103 after which the locking ring may be pulled back, in the direction of the fiber side of the MPO connectors 103, to disconnect the MPO connectors 103.

Figure 2:
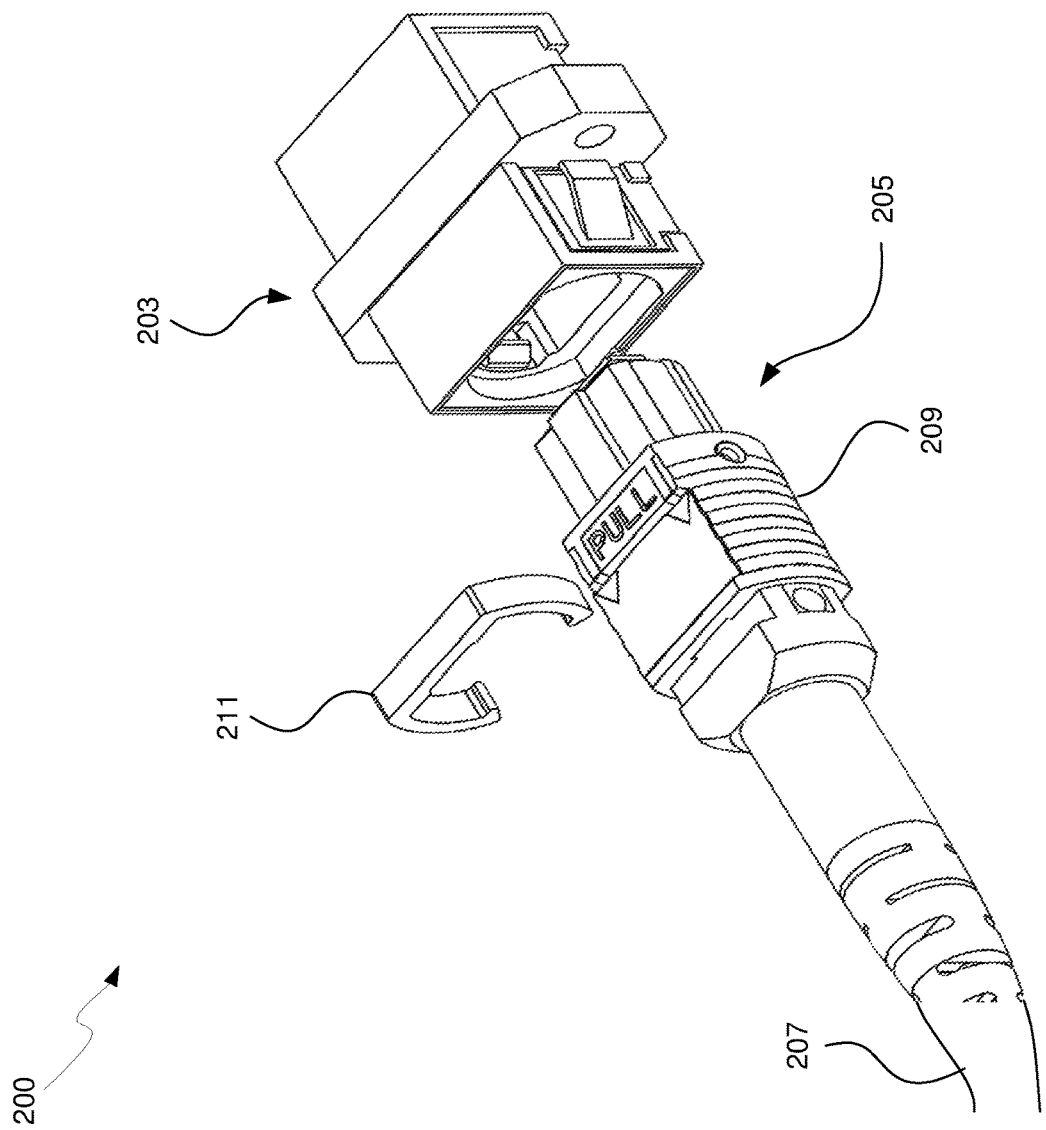
FIG. 2 illustrates a multi-fiber push-on/push-off connector with a locking clip, in accordance with an example embodiment of the disclosure.
Figure 3:
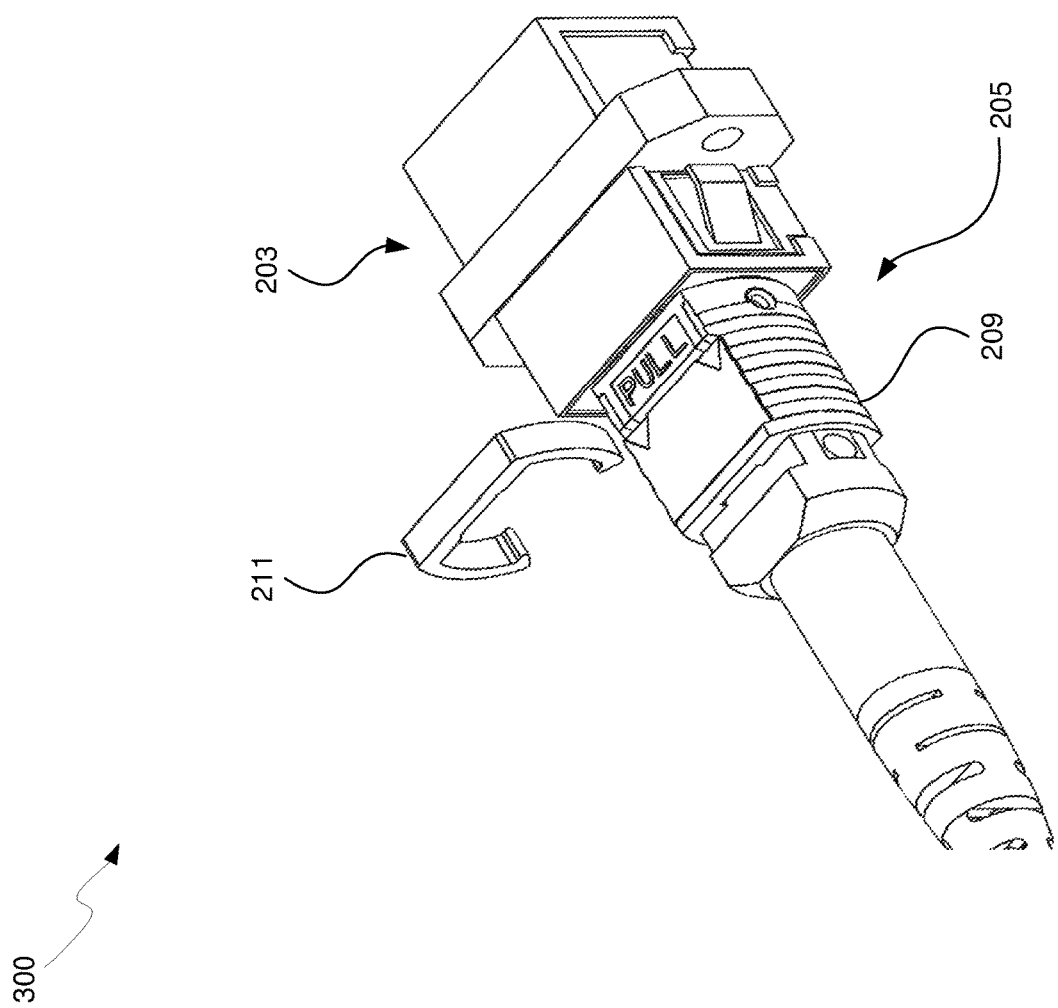
FIG. 3 illustrates the coupling of a multi-fiber push-on/push-off connector to a multi-fiber push-on/push-off adaptor, in accordance with an example embodiment of the disclosure.
Figure 4:
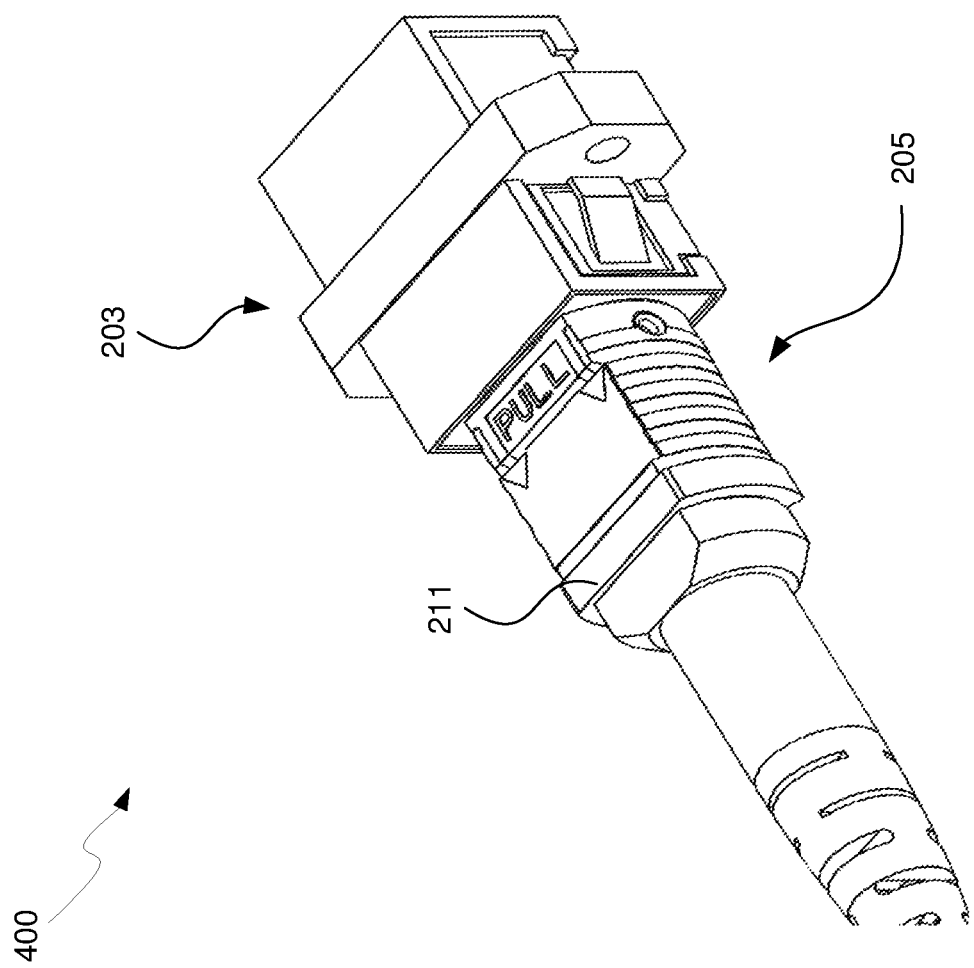
FIG. 4 illustrates the securing of a multi-fiber push-on/push-off connector to a multi-fiber push-on/push-off adaptor with a locking clip, in accordance with an example embodiment of the disclosure.

The MPO adaptor and connector with locking ring are shown further with respect to FIGS. 2-4.

FIG. 2 illustrates a multi-fiber push-on/push-off connector with a locking clip, in accordance with an example embodiment of the disclosure. Referring to FIG. 2, there is shown an optical interconnect 200 comprising an MPO adaptor 203, an MPO connector 205, and an optical fiber 207. The MPO connector 205 comprises an MPO connector pull-to-release housing 209, and MPO locking clip 211.

The MPO adaptor 203 may be coupled at one end, opposite to the end facing the MPO connector 205, to an optical device, such as the optical device 101A or 101B, or any other optical structure, including another optical fiber. The MPO connector 205 may be affixed to optical fiber 207, thereby providing a connection to the optical fiber 207.

The MPO connector pull-to-release housing 209 may be utilized to remove the MPO connector 205 from the MPO adaptor 203, where the housing 209 may be pulled in the direction away from the MPO adaptor 203, thereby detaching the housing 209 from the MPO adaptor 203. The MPO locking clip 211 may comprise a C-shaped clip that may be inserted onto the MPO connector 205 behind the MPO connector pull-to-release housing 209 to preclude any inadvertent disconnect of the MPO connector 205 with the MPO adaptor 203, as shown with respect to FIG. 4. In an example scenario, the MPO adaptor 203, the MPO connector 205, the MPO connector pull-to-release housing 209, and the MPO locking clip 211 comprise plastic, although other materials are possible, such as metal or ceramic.

FIG. 3 illustrates the coupling of a multi-fiber push-on/push-off connector to a multi-fiber push-on/push-off adaptor, in accordance with an example embodiment of the disclosure. Referring to FIG. 3, there is shown optical interconnect 300 showing the MPO connector 205 being operatively coupled to the MPO adaptor 203 by pushing the MPO connector 205 into the MPO adaptor 203, before insertion of the MPO locking clip 211 adjacent to the MPO connector pull-to-release housing 209.

When the MPO connector 205 is operatively coupled to the MPO adaptor 203 as shown in FIG. 3, it can easily be removed by pulling on the MPO connector pull-to-release housing 209 and may be inadvertently or accidentally removed by a motion of the optical interconnect 300 such that the MPO connector pull-to-release housing 209 is moved with respect to the MPO adaptor 203.

FIG. 4 illustrates the securing of a multi-fiber push-on/push-off connector to a multi-fiber push-on/push-off adaptor with a locking clip, in accordance with an example embodiment of the disclosure. Referring to FIG. 4, there is shown optical interconnect 400 showing the MPO connector 205 being operatively coupled to the MPO adaptor 203 by pushing the MPO connector 205 into the MPO adaptor 203, and after insertion of the MPO locking clip 211 adjacent to the MPO connector pull-to-release housing 209. In this manner, the MPO connector pull-to-release housing 209 cannot inadvertently be pulled to disconnect the MPO connector 205 from the MPO adaptor 203.

The MPO locking clip 211 enables securing of the MPO connector optical interconnect 400 while still allowing for disconnecting of the MPO connector 205 or for coupling a different optical cable to the MPO adaptor 203.

In an embodiment of the disclosure, a method and system are disclosed for a multi-fiber push-on/pull-off connector locking clip. In this regard, aspects of the disclosure may comprise a multi-fiber push-on/push-off (MPO) adaptor, an MPO connector having an MPO connector pull-to-release housing, and an MPO locking clip. The MPO connector is operable to be inserted into the MPO adaptor and the locking clip is coupled to the MPO connector adjacent to the MPO connector pull-to-release housing, thereby preventing the MPO connector pull-to-release housing from being actuated. An optical cable may be coupled to the MPO connector. The adaptor may be coupled to an optical device. The optical device may comprise an optical transceiver. The MPO locking clip may be plastic or metal. The MPO connector and the MPO connector pull-to-release housing may be plastic.

In another example scenario, the system may comprise a multi-fiber push-on/push-off (MPO) adaptor, an optical fiber an MPO connector having an MPO connector pull-to-release housing, the MPO connector coupled to the optical fiber, and a plastic MPO locking clip. The MPO connector is operable to be inserted into the MPO adaptor and the plastic locking clip is coupled to the MPO connector adjacent to the MPO connector pull-to-release housing, thereby preventing the MPO connector pull-to-release housing from being actuated.

While the invention has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiments disclosed, but that the present disclosure will include all embodiments falling within the scope of the appended claims.

What is claimed is:
1. A method for communication, the method comprising: operatively coupling an optical fiber connector to an optical fiber adaptor by insertion of the optical fiber connector into the optical fiber adaptor, wherein the optical fiber connector comprises an optical fiber connector pull-to-release housing; and securing the optical fiber connector to the optical fiber adaptor by placing a single C-shaped optical fiber locking clip around a portion of an outer surface of the optical fiber connector pull-to-release housing once the optical fiber connector is coupled to the optical fiber adaptor, thereby preventing the optical fiber connector pull-to-release housing from being actuated.

2. The method according to claim 1, wherein an optical cable is coupled to the optical fiber connector.

3. The method according to claim 1, wherein the adaptor is coupled to an optical device.

4. The method according to claim 3, wherein the optical device comprises an optical transceiver.

5. The method according to claim 1, wherein the optical fiber locking clip is plastic.

6. The method according to claim 1, wherein the optical fiber locking clip is metal.

7. The method according to claim 1, wherein the optical fiber connector and the optical fiber connector pull-to-release housing are plastic.

8. A system for communication, the system comprising:
an optical fiber adaptor, an optical fiber connector having an optical fiber connector pull-to-release housing, and a single C-shaped optical fiber locking clip, the optical fiber connector being operable to be inserted into the optical fiber adaptor and the locking clip being coupled around a portion of an outer surface of the optical fiber connector adjacent to the optical fiber connector pull-to-release housing once the optical fiber connector is coupled to the optical fiber adaptor, thereby preventing the optical fiber connector pull-to-release housing from being actuated.

9. The system according to claim 8, wherein an optical cable is coupled to the optical fiber connector.

10. The system according to claim 8, wherein the adaptor is coupled to an optical device.

11. The system according to claim 10, wherein the optical device comprises an optical transceiver.

12. The system according to claim 8, wherein the optical fiber locking clip is plastic.

13. The system according to claim 8, wherein the optical fiber locking clip is metal.

14. The system according to claim 8, wherein the optical fiber connector and the optical fiber connector pull-to-release housing are plastic.

15. A system for communication, the system comprising:
an optical fiber adaptor;
an optical fiber;
an optical fiber connector having an optical fiber connector pull-to-release housing, the optical fiber connector coupled to the optical fiber; and
a single plastic C-shaped optical fiber locking clip, the optical fiber connector being operable to be inserted into the optical fiber adaptor and the plastic locking clip being coupled around a portion of an outer surface of the optical fiber connector adjacent to the optical fiber connector pull-to-release housing once the optical fiber connector is coupled to the optical fiber adaptor, thereby preventing the optical fiber connector pull-to-release housing from being actuated.

* * * * *